(12) United States Patent
Cleary et al.

(10) Patent No.: US 7,587,361 B2
(45) Date of Patent: Sep. 8, 2009

(54) METHODS AND APPARATUS FOR ELECTRONIC REPORTING OF MORTGAGE DELINQUENCY

(75) Inventors: Jill Alese Cleary, Raleigh, NC (US); Karen Yandle Carpenter, Clayton, NC (US); Dawn Marie Wilson, Raleigh, NC (US); Marian Joan Murphy, Cary, NC (US); Daniel Earl Williamson, Raleigh, NC (US)

(73) Assignee: GE Mortgage Holdings, LLC, Raleigh, NC (US)

( * ) Notice: Subject to any disclaimer, the term of this patent is extended or adjusted under 35 U.S.C. 154(b) by 1456 days.

(21) Appl. No.: 09/683,660

(22) Filed: Jan. 31, 2002

(65) Prior Publication Data

US 2003/0144948 A1 Jul. 31, 2003

(51) Int. Cl.
*G06Q 40/00* (2006.01)
(52) U.S. Cl. .............................. 705/38; 705/35; 705/36; 705/37; 705/39
(58) Field of Classification Search .............. 705/35–39
See application file for complete search history.

(56) References Cited

U.S. PATENT DOCUMENTS

| | | | | | |
|---|---|---|---|---|---|
| 5,852,811 | A | * | 12/1998 | Atkins | 705/36 R |
| 5,940,812 | A | * | 8/1999 | Tengel et al. | 705/38 |
| 6,304,860 | B1 | * | 10/2001 | Martin, Jr. et al. | 705/43 |
| 6,643,625 | B1 | * | 11/2003 | Acosta et al. | 705/30 |
| 2001/0044773 | A1 | * | 11/2001 | Sellers et al. | 705/38 |
| 2003/0018558 | A1 | * | 1/2003 | Heffner et al. | 705/37 |
| 2005/0154664 | A1 | * | 7/2005 | Guy et al. | 705/35 |

* cited by examiner

*Primary Examiner*—Harish T. Dass
*Assistant Examiner*—Hatem Ali
(74) *Attorney, Agent, or Firm*—Priest & Goldstein

(57) ABSTRACT

Techniques for managing mortgage delinquency information are described. A system for managing and reporting mortgage delinquency information according to an aspect of the present invention comprises a delinquency information database for receiving, storing and maintaining mortgage delinquency information entries, each mortgage delinquency information entry comprising information identifying and providing relevant details about a delinquent mortgage, and a delinquency information manager operative to retrieve delinquency information entries from the delinquency information database and store delinquency information entries in the delinquency information database, the delinquency information manager being accessible to a user computer through a publicly accessible network and presenting one of a selection of interfaces upon selection by the user to allow the user to transmit delinquency information from the user computer through the publicly accessible network, the interfaces including forms for creating new entries, modifying existing entries, and identification and uploading of a file containing delinquency information.

19 Claims, 15 Drawing Sheets

*(form fields shown)*

City: SIOUX CITY
602
State: South Dakota    Zip: 51105

Current Principle Balance: 175000
Loan Due Date: MM 10  DD 01  YYYY 2001

Mortgage Payment: 1237
Toal Delinquent Ammount: 5300

Reason For Default: Unknown
Occupancy Status:

Dropdown (646 / 662):
- Unknown
- Unemployment
- Marital problems
- Illness
- Death
- Business Failure
- Temporary loss of income
- Bankrupcy
- Excessive use of credit
- Casualty loss
- Moved/vacated Bankruptcy File Date:
Bankruptcy Chapter:
Release Date Attorney/Foreclosure: MM DD YYYY Foreclosure Sale Scheduled Date:
Date Title Acquired:
Redemption Expiration Date:
Claim File Date:

METHODS AND APPARATUS FOR ELECTRONIC REPORTING OF MORTGAGE DELINQUENCY

BACKGROUND OF INVENTION

The present invention relates generally to improved techniques for automating the reporting of mortgage loan delinquency status. More particularly, the invention relates to advantageous techniques for electronic transmission of mortgage delinquency information using a publicly accessible data transmission network such as the Internet.

Many real estate loans employ mortgage insurance in order to allow a borrower to purchase property using a lower down payment than would otherwise be required. A mortgage insurance policy is purchased to protect the mortgage servicing entity servicing the mortgage. If a borrower defaults on an insured loan and the default is followed by a covered event which causes a loss to the mortgage servicing entity, the mortgage servicing entity may submit to a mortgage insurer a claim for payment under the terms of the insurance policy. Events giving rise to a claim may include foreclosure and sale of the property. Other covered events include a deed in lieu of foreclosure, in which the borrower gives title to the property to the mortgage insurer in order to avoid foreclosure proceedings. Another covered event is be an approved short sale of the property, in which the servicer allows the borrower to sell the property for less than the amount owing.

In order to reduce the risk of loss, the typical mortgage insurer requires a mortgage servicing entity to report all loans which become delinquent. If a mortgage insurer learns that a loan is delinquent, it can help the servicing entity take steps to help the delinquent borrower avoid foreclosure, for example by contacting the borrower to find out why payment has not been made and by proposing ways in which the delinquency can be corrected. In cases in which it appears that the delinquency cannot be cured, learning of the delinquency helps the mortgage insurer act to mitigate potential losses. Such prompt action may reduce the time during which the property may deteriorate in condition and value due to neglect by the borrower and may reduce other expenses resulting from a delay in foreclosure of the mortgage. Prompt notice of a delinquency and appropriate action by the mortgage insurer may increase the amount recovered at a foreclosure sale, reducing losses on the mortgage insurance policy. Thus, timely reporting of delinquency helps to minimize losses due to defaults, and benefits mortgage insurers, servicing entities and borrowers.

Many servicing entities, especially those servicing a small or moderate number of loans, do not use specialized electronic equipment or software for submission of delinquency reports. Such servicing entities typically use paper documents to report delinquencies. These documents are submitted to the mortgage insurer and the mortgage insurer enters the data from the paper documents into an information management system. Such submission of delinquency reports using paper documents creates expense because the insurer must provide the labor needed to enter the information from the paper documents into the insurer's information management system. Moreover, transcription errors may occur as the mortgage insurer transfers the information into its system. Considerable expense could be saved, and errors prevented, by a system allowing servicing entities to report delinquencies to a mortgage insurer without a need for the servicing entity to use specialized software or equipment in order to report the delinquencies.

SUMMARY OF INVENTION

A system for managing and reporting mortgage delinquency information according to an aspect of the present invention comprises a delinquency information database for receiving, storing and maintaining mortgage delinquency information entries, each mortgage delinquency information entry comprising information identifying and providing relevant details about a delinquent mortgage, and a delinquency information manager operative to retrieve delinquency information entries from the delinquency information database and store delinquency information entries in the delinquency information database.

The delinquency information manager is accessible to a user computer through a publicly accessible network and presents one of a number of selectable interfaces upon selection by the user to allow the user to transmit delinquency information from the user computer through the publicly accessible network. The selection of interfaces may include a form for creation and transmission of new delinquency information entries, a form for modification of previously submitted delinquency information entries and an interface for identification and uploading of a file containing delinquency information. The delinquency information manager is operative to format the delinquency information and store it in the delinquency information database in the form of delinquency information entries after the delinquency information is received from the user computer.

A method of delinquency information management according to another aspect of the present invention comprises the steps of establishing an account identifying a mortgage servicing entity and establishing a connection with a user computer through a publicly accessible network and, upon presentation of authentication information associated with the account, allowing access by the user computer to an electronic data storage area and allowing retrieval from the electronic data storage area of previously stored entries identified with the account and storage in the electronic data storage area of new or updated entries identified with the account.

Upon receipt of commands and selections from a user through the user computer, one or more interfaces is presented to the user to allow creation, review, modification and storage of delinquency information entries. Each delinquency information entry includes delinquency information identifying and providing relevant details about a mortgage associated with the servicing entity. At least one available interface allows identification and upload of a file from the user computer. Upon receipt of one or more delinquency information entries from the user computer and receipt of a command to store the delinquency information entries, the delinquency information entries are stored in the electronic data storage area.

A more complete understanding of the invention, as well as further features and advantages of the invention, will be apparent from the following Detailed Description and the accompanying drawings.

BRIEF DESCRIPTION OF DRAWINGS

FIGS. 6A-6E illustrate a hypertext page allowing creation and saving of a delinquency information entry;

FIGS. 7A and 7B illustrate a page displaying details of a previously saved delinquency information entry;

DETAILED DESCRIPTION

Figure 1:
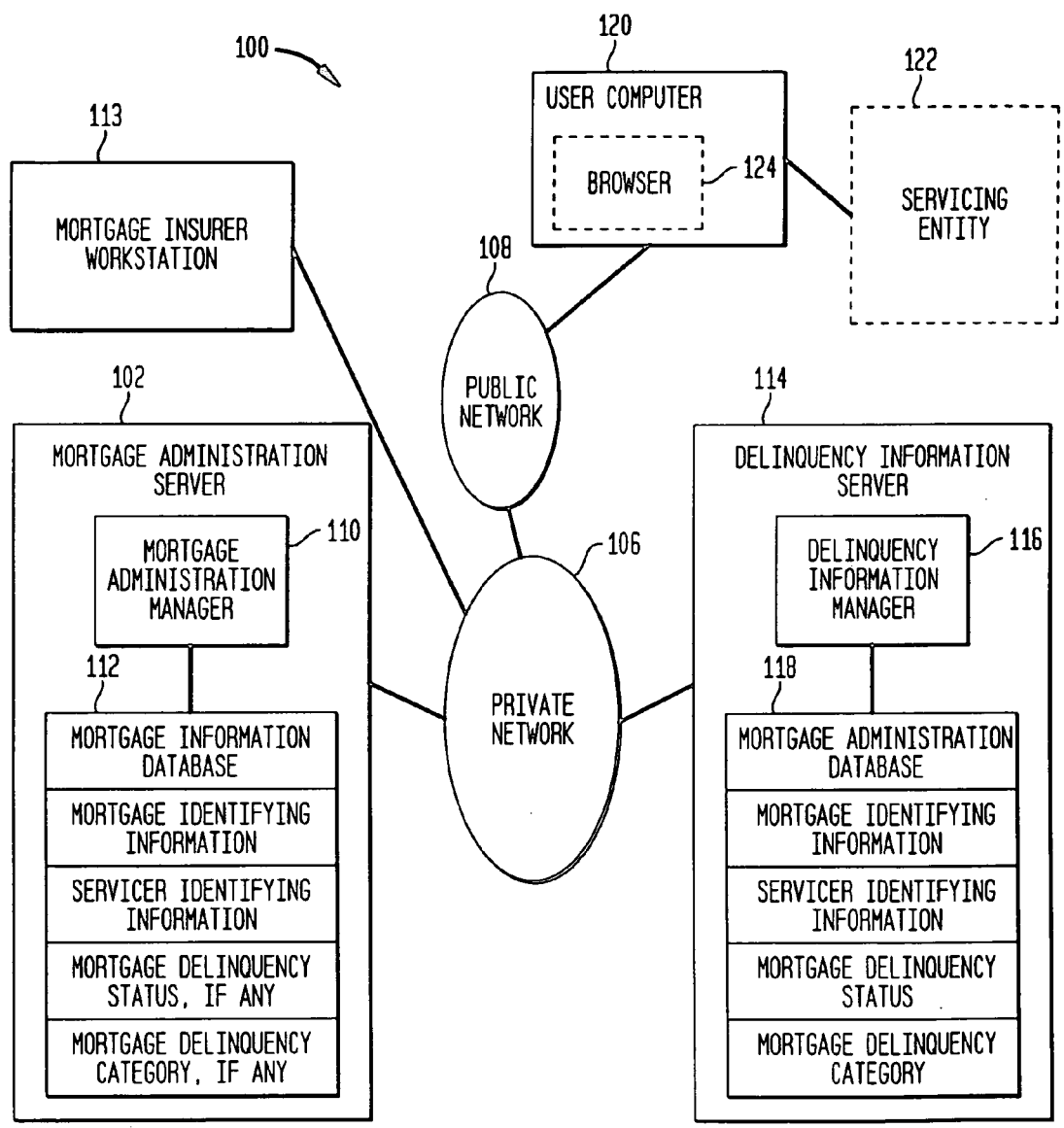
FIG. 1 illustrates a system for managing and reporting delinquency information according to an aspect of the present invention.

FIG. 1 illustrates a delinquency reporting system 100 according to an aspect of the present invention. The system 100 comprises a mortgage administration server 102, suitably operated by or for a mortgage insurer. The server 102 is preferably connected to a private network 106, and the private network 106 is in turn connected to a publicly accessible network 108, which may suitably be the Internet.

The server 102 hosts a mortgage administration manager 110 which is used to manage identification information and other relevant information about mortgages. These are typically mortgages insured by a mortgage insurer by or for whom the system 100 is operated. The mortgage administration manager 110 is preferably a software program or set of programs running on the server 102. The mortgage administration manager 110 has access to a mortgage information database 112 in which mortgage information, including identification and other information is stored. The mortgage information is preferably stored in the form of mortgage information entries. The identification information may include a certificate number, identifying a certificate of insurance previously issued to a servicing entity. A certificate having a unique certificate number is issued for each insured loan, and information relating to the loan is associated with this certificate in the database 112. Information associated with the mortgage certificate may include identification of the particular servicing entity, identification of the real property securing the insured mortgage, identification of the borrower obligated to pay the mortgage, and other information useful in administering mortgage insurance. Of particular importance is information relating to mortgages which have been reported delinquent by the servicing entity. Such information includes the fact that a particular mortgage is delinquent, identification information, and information relating to the degree of delinquency of the mortgage. Such information may include number of days or months of delinquency, or may alternatively include the mortgage due date, allowing computation of the number of days or months of delinquency. Other information may include a delinquency category, for example whether a mortgage is more or less than three months delinquent, whether the mortgage is in foreclosure, whether a mortgage insurance claim has been filed or other desired categories to indicate actions which have been or need to be taken. The mortgage administration manager 110 and the mortgage information database 112 are accessible, for example, using a mortgage insurer workstation 113 which may be operated by an employee of the mortgage insurer for whom the information in the database 112 is maintained. A user of the workstation 113 can invoke the mortgage administration manager 110 to store, retrieve and update information in the database 112.

A mortgage insurer by or for whom the system 100 may be operated may require that servicing entities provide updated delinquency information according to a prescribed schedule, for example monthly. Delinquency information may be provided in a number of different ways. For example, servicing entities may be permitted to submit paper delinquency reports. Upon receipt of the delinquency reports, the delinquency information in the reports is entered into the database 112, for example by invoking the mortgage administration manager 110 using the workstation 113, and creating and storing mortgage information entries corresponding to the information in the reports. Large servicing entities may compile delinquency information in electronic format using their own specialized equipment, and may provide the information for electronic transfer into the database 112. For example, a servicing entity may submit delinquency information on magnetic tape.

In addition to, or as an alternative to, preparing delinquency reports on paper or submitting reports using specialized equipment, it is also possible for servicing entities to submit reports over the publicly available network 108. In order to allow submission of reports over the network 108, the system 100 includes a delinquency reporting server 114 connected to the network 106. The delinquency reporting server 114 hosts a delinquency information manager 116, which is preferably a software program or set of programs running on the server 114. A user, for example an employee of a servicing entity, can invoke the delinquency information manager 116 using a computer which connects to the delinquency reporting server 114 through the public network 108 and in turn through the private network 106. The delinquency information manager 116 maintains a delinquency information database 118, hosted on the delinquency reporting server 1114. The delinquency information database 118 includes delinquency information entries identifying and containing information about delinquent mortgages. Information contained in each entry may suitably be the mortgage insurance certificate number, identifying information relating to the borrower, the principal amount of the mortgage, amount of delinquency, the loan due date, and any other desired information describing the status of the mortgage, such as whether or not foreclosure proceedings have begun or whether a mortgage insurance claim has been filed. All delinquency information entries also indicate the identity of the servicing entity, so that entries identified with a particular servicing entity may be retrieved and viewed by authorized users associated with that servicing entity, but not by other users associated with other servicing entities. For example, an account may be established for a particular servicing entity. The account may be identified by a username or account number. Each mortgage information entry in the database 112 will also contain the account number or username associated with the entity servicing the mortgage identified in the entry. In this way, an entry can be identified with the entity servicing the mortgage described in the entry, and restricted to authorized users such as users associated with the servicing entity or with the insurer by or for whom the system 100 is operated. Such restrictions protect the privacy of borrowers and the proprietary information of mortgage servicing entities.

In the present exemplary embodiment, the user computer 120 is used to establish a connection to the delinquency reporting server 114 in order to invoke the delinquency information manager 116. The user computer 120 is preferably operated by an authorized employee of the servicing entity 122, and is used to review and submit information relating to mortgages serviced by the servicing entity 122. For simplicity of description, only the single computer 120 and the servicing entity 122 are shown here, but it will be recognized that the system 100 may allow connections to the delinquency information server 114 from any number of user computers such as the computer 120.

The delinquency information manager 116 preferably presents information to users and receives information from users through hypertext pages. A user of a user computer such as the computer 120 suitably invokes the delinquency information manager by pointing a hypertext browser to a uniform resource locator (URL) containing an address of a desired page.

For example, a user of the computer 120 may initially enter into a browser 124 an address of a initial welcome page. Details of this and subsequent pages are discussed below and illustrated in FIGS. 2-8. Preferably, an account has previously been established for the servicing entity for which the user computer 120 is operated. This account is associated with all delinquency information entries for mortgages serviced by the servicing entity for which the account was established. The account is associated with and accessed through the entry of a username and password issued to the servicing entity. The initial welcome page therefore preferably includes fields for entry of the username and password. The user enters the username and password, and upon authentication of the username and password is allowed to navigate to subsequent pages allowing the user to review and modify previously submitted delinquency information and to enter new notices of delinquency. For example, the user may be presented with a table containing entry descriptions. Each entry description identifies a delinquency information entry relating to a mortgage serviced by the servicing entity. The user preferably is allowed to sort the entries by selected criteria, such as mortgage insurance certificate number, borrower name, borrower social security number or other information useful for sorting or indexing entries. Preferably, one or more elements of each entry description is in the form of a hypertext link, so that the user can retrieve the mortgage delinquency entry associated with the entry description by activating the hypertext link. In addition, the user is given other ways to retrieve an entry, for example by entering a certificate number or loan number and selecting a command to retrieve the entry associated with the entered number.

Upon receiving a user command to retrieve an entry, the delinquency information manager 116 retrieves and displays a hypertext page showing details of the entry, as well as fields allowing editing of information contained in the entry. Upon making the desired changes, the user can choose to save the information. Upon selecting the option of saving the new information, the delinquency information manager 116 updates the delinquency information database 118 to reflect the updated information.

In addition to modifying existing entries, the user may also be allowed to create new entries by making an appropriate selection. When the user chooses to create a new entry, he or she is preferably presented with a form for entering delinquency information. The user can then enter the information and select to save the information. Upon a selection to save the information, the delinquency information manager 116 creates a new entry and stores the entry in the delinquency information database 118.

Preferably, the delinquency information manager 116 also provides the user with an option to upload a previously prepared file including delinquency information. The file may suitably be a data file usable with a commonly used database, spreadsheet or other appropriate application, and may be in a format or adhere to a template previously provided to the user or downloadable from the system 100. Upon receiving the file, the delinquency information manager 116 creates appropriate entries and stores the entries in the delinquency information database 118.

Preferably, saving new or updated information in the delinquency information database 118 does not immediately submit this information to the mortgage administration manager 110 and the mortgage information database 112, but instead simply stores the information in correct format so that the user associated with the servicing entity can submit this information when desired. The user may submit the information immediately after saving it, after further modifying it, or at any other time. In order to submit the information, the user navigates to an appropriate hypertext page hosted by the delinquency information server 116 and activates a "submit" command. The "submit" command is different from the command used to save the information. After activation of the "submit" command, the delinquency information manager 116 retrieves the delinquency information associated with the servicing entity from the delinquency information database. The delinquency information manager 116 then transmits the delinquency information to the server 102, where it is examined by the mortgage administration manager 110. The mortgage administration manager 110 stores any new or updated delinquency information in the mortgage information database 112, along with the date and time of submission.

Once the information has been stored in the mortgage information database 112, it is accessible to authorized persons having responsibility for dealing with mortgage insurance issues relating to the mortgages concerning which the information was received. Such persons have access to the database 112 and through searching the database 112 or by automatic notification by the mortgage administration manager 110, these persons can be made aware of the status of the delinquent mortgages and, where appropriate, can use the status information to make decisions about which actions to take in order to resolve the delinquency. For example, the mortgage administration manager 110 may assign an "alert" category to a mortgage for which information is stored in the database 112, for which the period of delinquency is more than four months but less than six months. The mortgage administration manager 110 may be designed to provide automatic notification of all mortgages falling into that category.

Employees or other authorized users of the mortgage insurer by or for whom the system 100 is operated may suitably update information in the database 112, for example to reflect changes in category or status of mortgages due to actions taken by the mortgage insurer. Such updating may be done, for example, by using the workstation 113 to invoke the mortgage administration manager 110 and enter appropriate commands and data. Such updated information may be useful to mortgage servicers who are servicing mortgages for which the information in the database 112 has been updated.

In order to make this updated information available to such users, the delinquency information manager 116 preferably periodically compares mortgage information entries in the database 112 with corresponding delinquency information entries in the database 118. When the delinquency information manager 116 detects that an entry in the database 112 is more current than the corresponding entry in the database 118, for example because action has been taken by the mortgage insurer and the entry has been updated to reflect that action, the delinquency information manager then updates the entry in the database 118 to correspond to the updated information in the corresponding mortgage information entry in the database 112.

Figure 2:
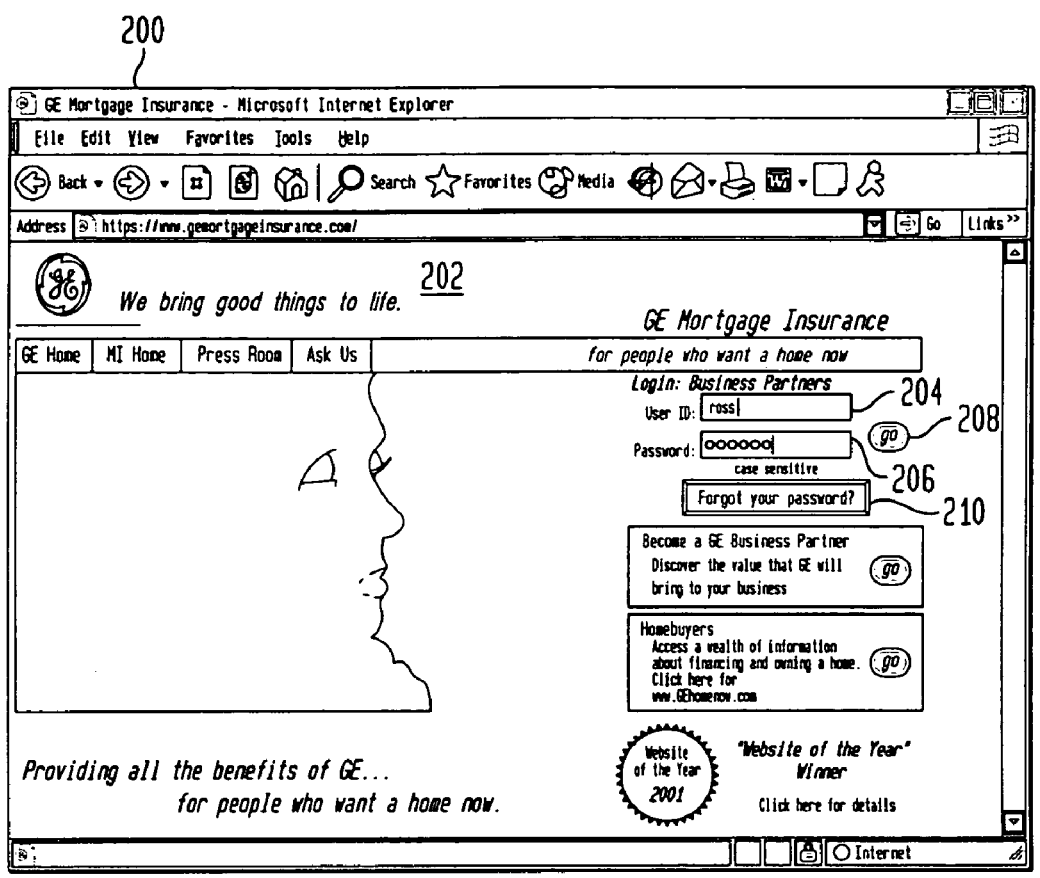
FIG. 2 illustrates an introductory hypertext page according to an aspect of the present invention.

FIG. 2 illustrates a hypertext browser 200 displaying an introductory hypertext page 202 which may suitably be presented by the delinquency information manager 116 of FIG. 1 upon entry of or linking to the address of the page 202. The page 202 includes fields 204 and 206 to allow entry of a username and password, respectively, as well as a "go" button 208 for submission of the username and password. The page 202 also includes a "Forget your Password?" button 210, which can be activated by the user to request assistance when he or she has forgotten his or her password. Because the delinquency information manager 116 provides access to highly sensitive information, the button 210 preferably causes the display of a telephone number or other means by which the user can request password assistance and does not simply provide for such measures as requesting emailing of a password.

Upon submission of an invalid username and password, the page 202 preferably displays a notice that the submitted user name and password are incorrect and allows the user to make additional attempts to submit the correct username and password. The delinquency information manager 116 may suitably log these attempts in order to allow evaluation of whether an excessive number of login attempts has been made, because this may indicate an attempt by unauthorized parties to gain access to sensitive information.

Figure 3:
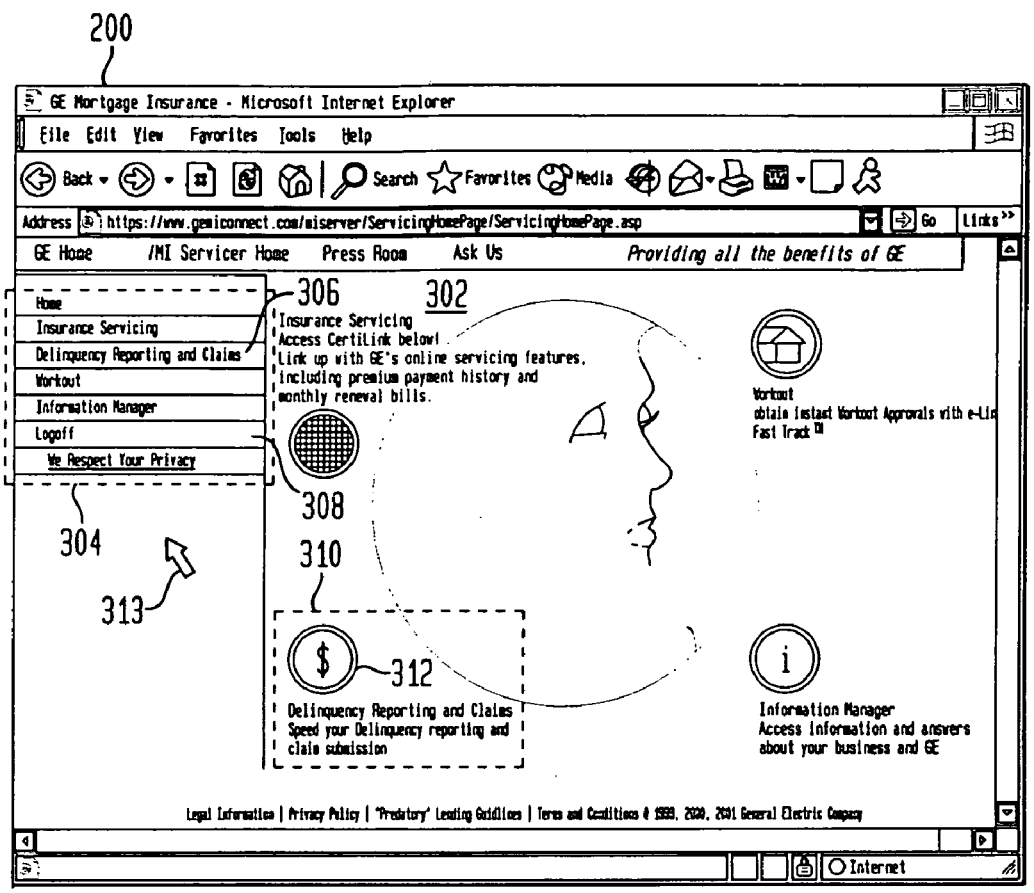
FIG. 3 illustrates an activity selection page according to an aspect of the present invention.

FIG. 3 illustrates the browser 200 displaying a hypertext page 302, reached after submission and authentication of a valid username and password. The page 302 allows activity selection by a user and includes a set of hypertext links 304, of which the "Delinquency Reporting and claims" link 306 and the "Logoff" link 308 are of particular interest. Activating the "Delinquency Reporting and claims" link 306 causes the display of a page allowing the user to view, enter and modify delinquency information. Activating the "Logoff" link disables access to user specific pages and information and requires entry of a username and password before any user specific information can be retrieved or displayed. The page 302 also includes a region 310, including an icon 312. Rolling the pointer 313 over the region 310 causes the display of a hyperlink command area. This feature is more clearly illustrated in FIG. 4.

Figure 4:
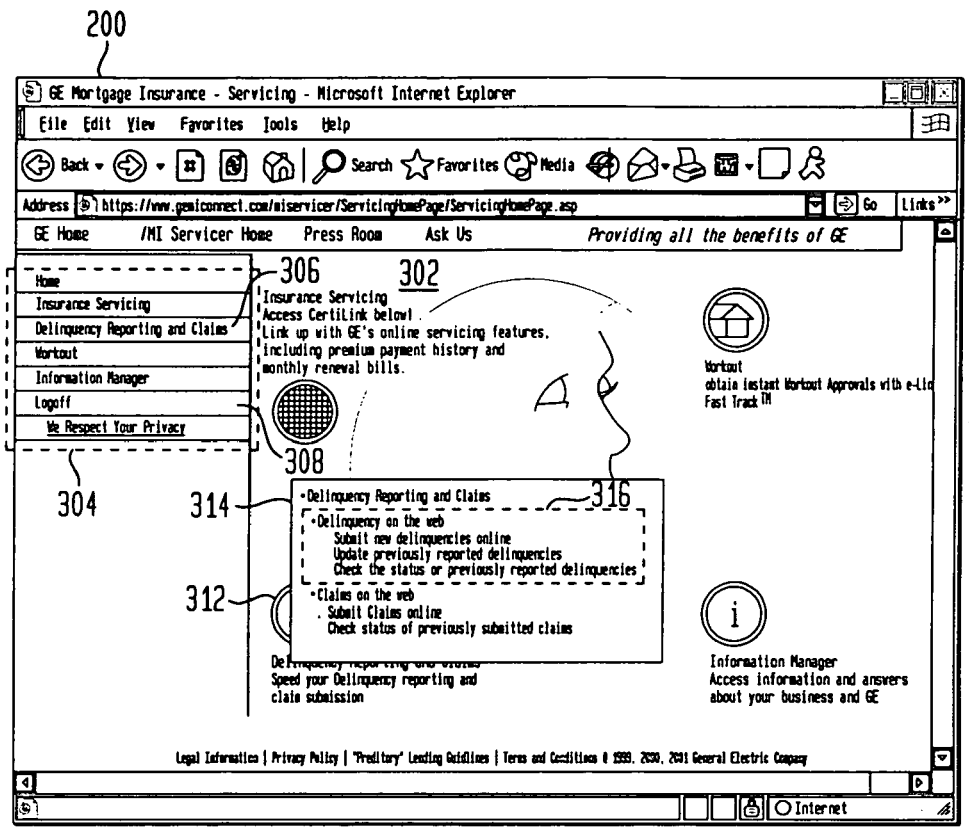
FIG. 4 illustrates additional elements of the page of FIG. 3.

FIG. 4 illustrates the page 302 after the pointer 313 of FIG. 3 has been placed in the vicinity of the icon 312. The elements 304-308 and 312 are visible, and also visible is a previously hidden link area 314, including a link 316. The link 316 has the same function as does the link 306 of FIGS. 3 and 4.

Figure 5A:
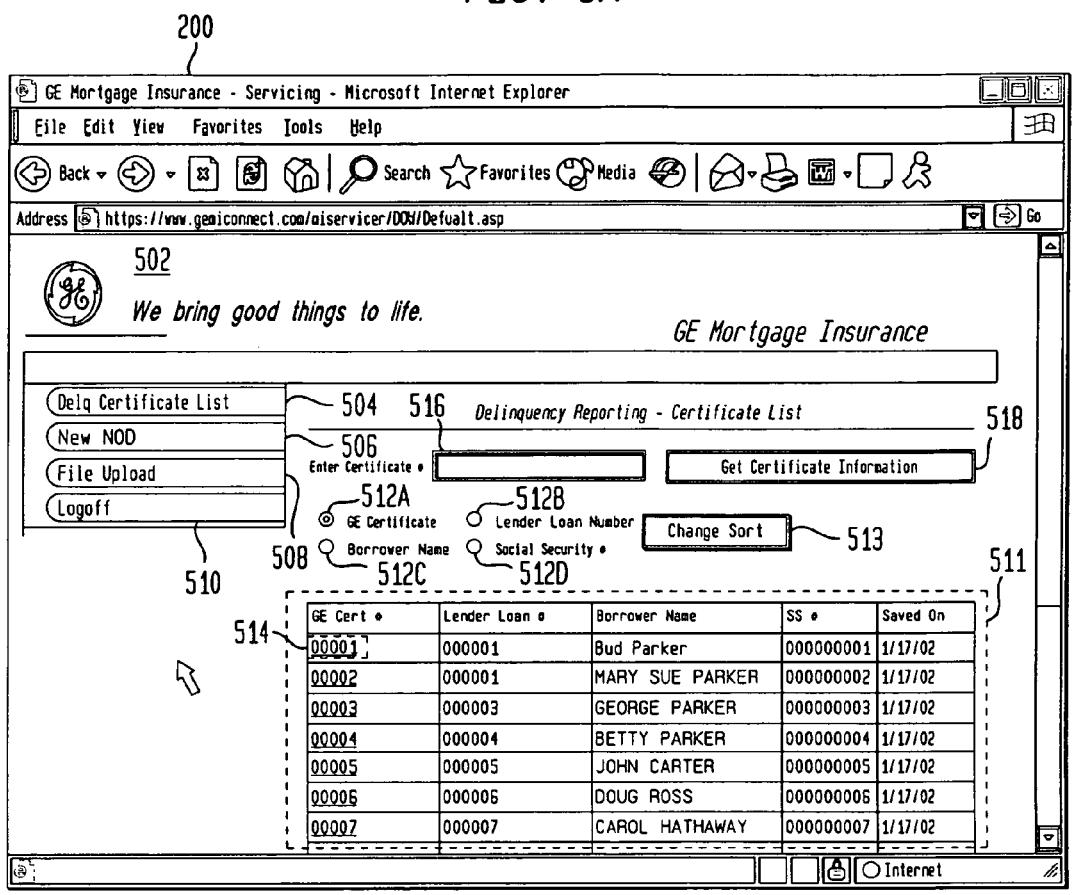
FIGS. 5A and 5B illustrate a hypertext page displaying a list of entries including delinquency information and allowing selection of an entry for display, as well as commands for submission of delinquency information.

FIG. 5A illustrates the browser 200, displaying a hypertext page 502, reached after activation of the link 306 of FIGS. 3 and 4 or the link 316 of FIG. 4. The page 502 provides access to previously entered delinquency information, allows display of information entries sorted according to a number of available criteria, and also allows the selection of various commands allowing entry of new information.

The page 502 includes command buttons for activating various features which can be invoked from the page 502. These command buttons are the "Delinquent Certificate List" command 504, the "New NOD" command 506, the "File Upload" command 508 and the "Logoff" command 510. The command buttons 502-510 are present in the page 502 and in a number of subsequent pages, and retain the same function in each page. The "Delinquent Certificate List" command 504 causes the page 502 to be displayed. The "New NOD" command 506 displays a page containing a form allowing entry of a new notice of delinquency. The "File Upload" command 508 allows a user to upload a file of delinquency information. The "Logoff" command 510 closes the user session and disables further access to information associated with the account for which the username and password were submitted. In order to regain access to information associated with the account, the user must return to the page 202 and resubmit the username and password.

The page 502 includes a list of delinquency information entries 511. The list 511 may be sorted according to criteria chosen using the selectors 512A-512D. A sorting criteria choice may be entered by activating the "Change Sort" button 513. The list 511 includes certificate numbers shown as hyperlinks, for example the link 514. Activating a link such as the link 514 causes retrieval of a previously entered notice of delinquency, allowing information in the notice of delinquency to be modified as desired. Alternatively, a user may enter a certificate number in the field 516 and retrieve the notice of delinquency identified with the certificate number by activating the "Get Certificate Information" command 518.

Figure 5B:
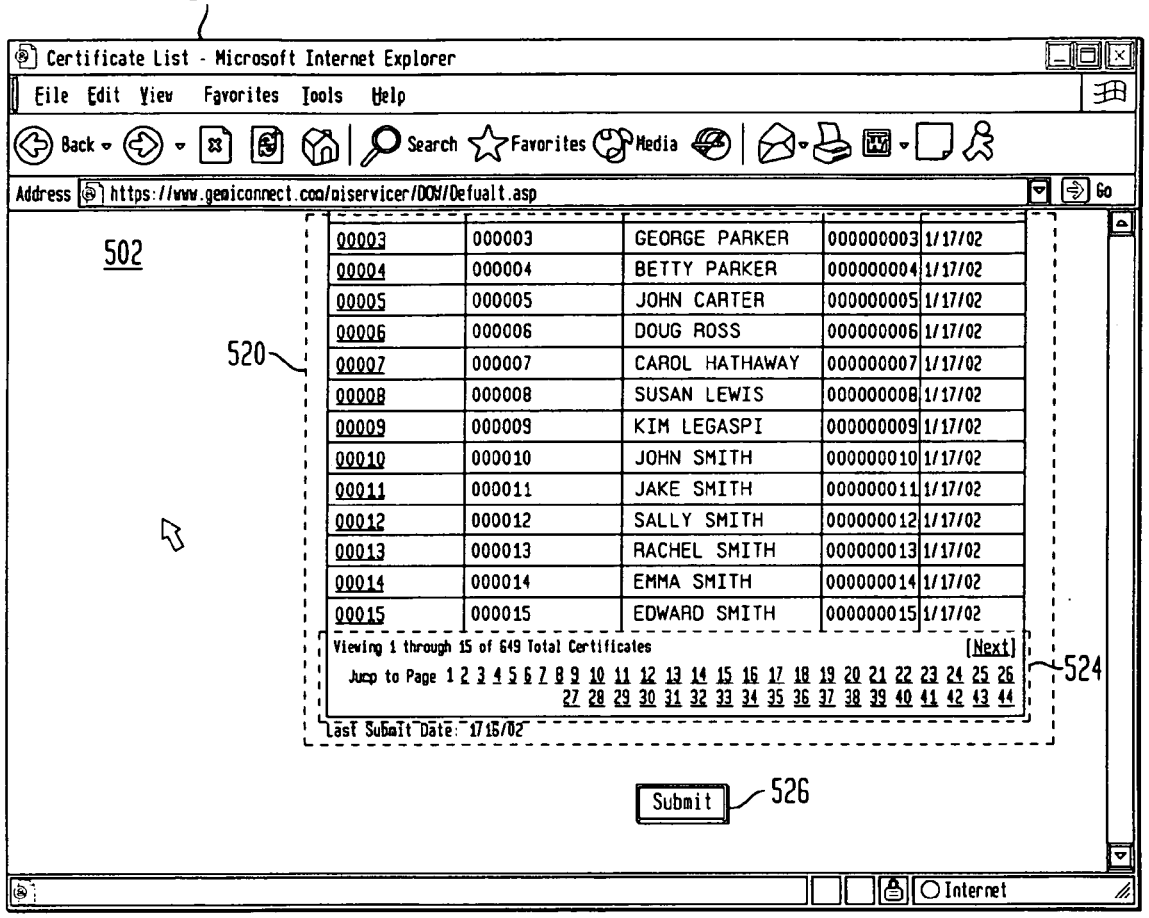

FIG. 5B illustrates elements of the page 502 not visible in FIG. 5A. The remainder of the list 511 can be seen, as well as a selection area 524, allowing selection of additional groupings of delinquency information entries. Also visible is a "Submit" button 526. Activation of the "Submit" button causes transmission from the database 118 to the database 112 of the delinquency information entries associated with the account being used. The completed transmission of the delinquency information entries allows the new or updated information within these entries to be used by the mortgage information manager 110, so that appropriate action can be taken with respect to the mortgages identified in the entries.

Figure 6A:
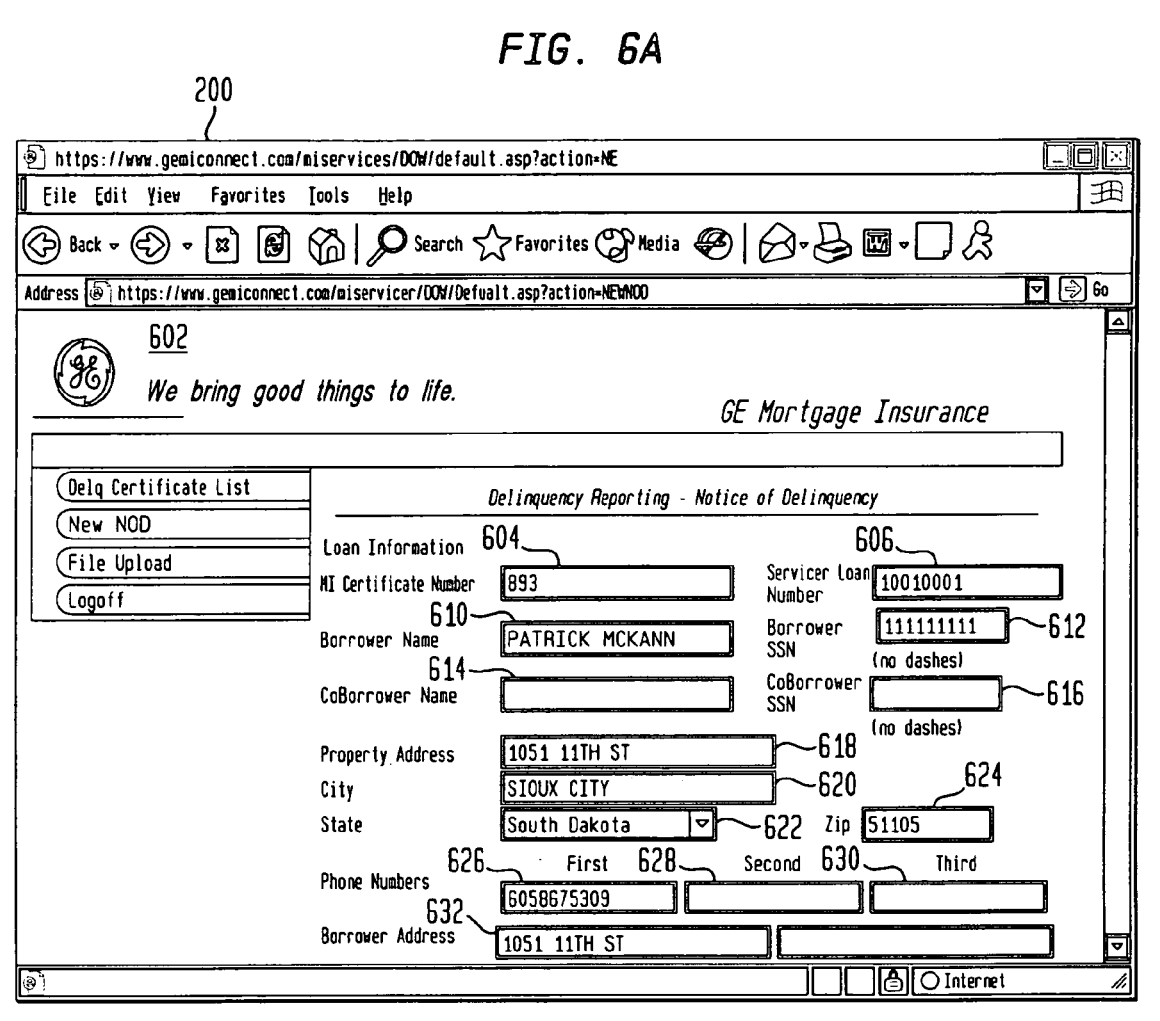

FIG. 6A illustrates the browser 200, displaying a hypertext page 602 which is presented after activation of the "New NOD" button. The hypertext page 602 is a form used for creating a notice of delinquency. A notice of delinquency is a data entry identifying a loan associated with a mortgage insurance certificate, and provides information identifying the loan and identifies the borrower and the property securing the loan and includes additional information identifying the delinquency status of the loan, such as the principal owing, the monthly payment amount, the amount delinquent, the date of the first overdue payment and additional information useful for evaluating the loan. Visible in FIG. 6A are fields 604-632. The indicated information identifying the loan, the borrower, the property address and the borrower address can be entered in these fields. If the borrower address is the same as the property address, the borrower address fields may be left blank, but if the borrower is not occupying the property and the address of the borrower is known, this information will typically be added.

Figure 6B:
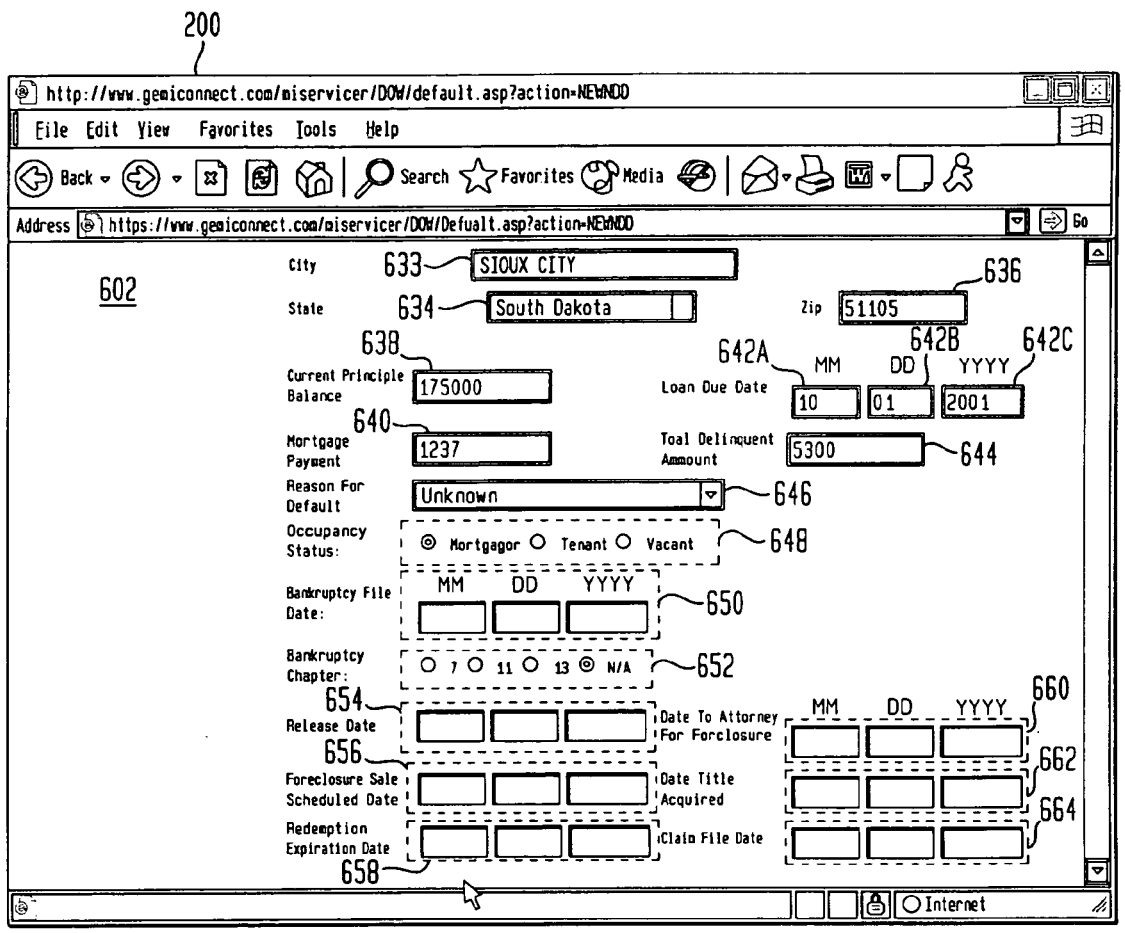

FIG. 6B illustrates the page 602 after it has been scrolled down to show additional elements. The fields 633-636 allow entry of the remainder of the borrower address. Also displayed are fields 638, 640, 642A-642C and 644, indicating the principal due, the monthly payment, the loan due data and the total delinquent amount. The total delinquent amount typically includes the total amount of the delinquent payments. Also displayed are additional elements, including a selector 646 used to open a scrolldown list allowing a selection identifying the reason for default, the field 648 indicating the occupancy status of the property, the field 650 indicating the date, if any, of bankruptcy filing by the borrower and the field 652 indicating the nature of any bankruptcy filing. Additional fields include the field 654 indicating the release date, the field 656 indicating the scheduled date of any foreclosure sale, and the field 658 indicating the expiration of the borrower's right to redeem the property. The fields 660-664 indicate the date, if any, the mortgage was sent to an attorney for foreclosure, the date, if any, title to the property was acquired by the servicing entity, and the date any mortgage insurance claim was filed.

Figure 6D:
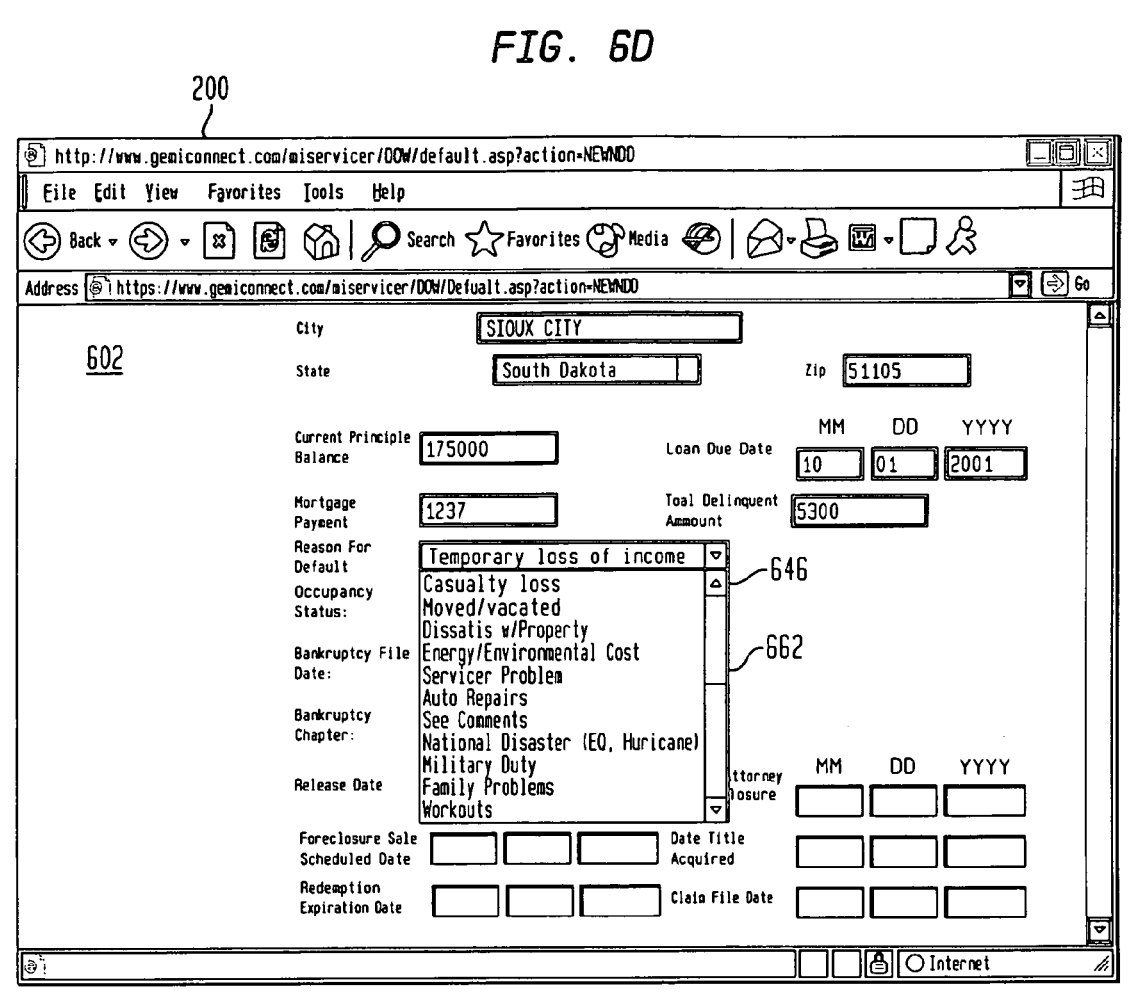

FIG. 6C illustrates the page 602, after the selector 646 has been activated to open the scrolldown list 662. FIG. 6D illustrates the page 602, showing the remaining selections in the scrolldown list 662.

Figure 6E:
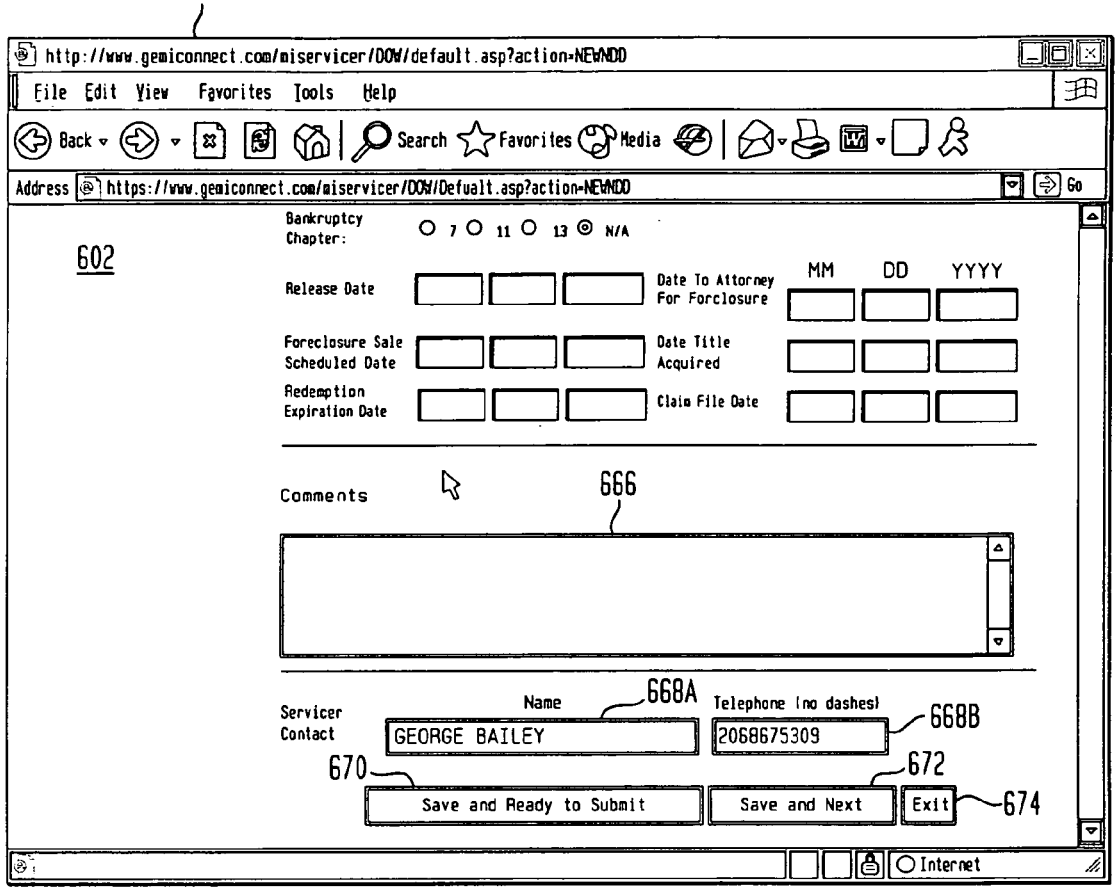

FIG. 6E illustrates the page 602, scrolled down to reveal the remaining elements. The page 602 includes a comments field 666 and fields 668A and 668B for the name and telephone number of a contact at the servicing entity. The page also includes a "Save and Ready to Submit" button 670, a "Save and Next" button 672 and an "Exit" button 674. Activating the "Save and Ready to Submit" button 670 saves the entered information in the database 118 and returns to the page previously displayed. Activating the "Save and Next" button 672 saves the entered information in the database 118 and displays the next entry in the list SI 1. Activating the "Exit" button 674 returns to the previously displayed page without saving any information.

Figure 7A:
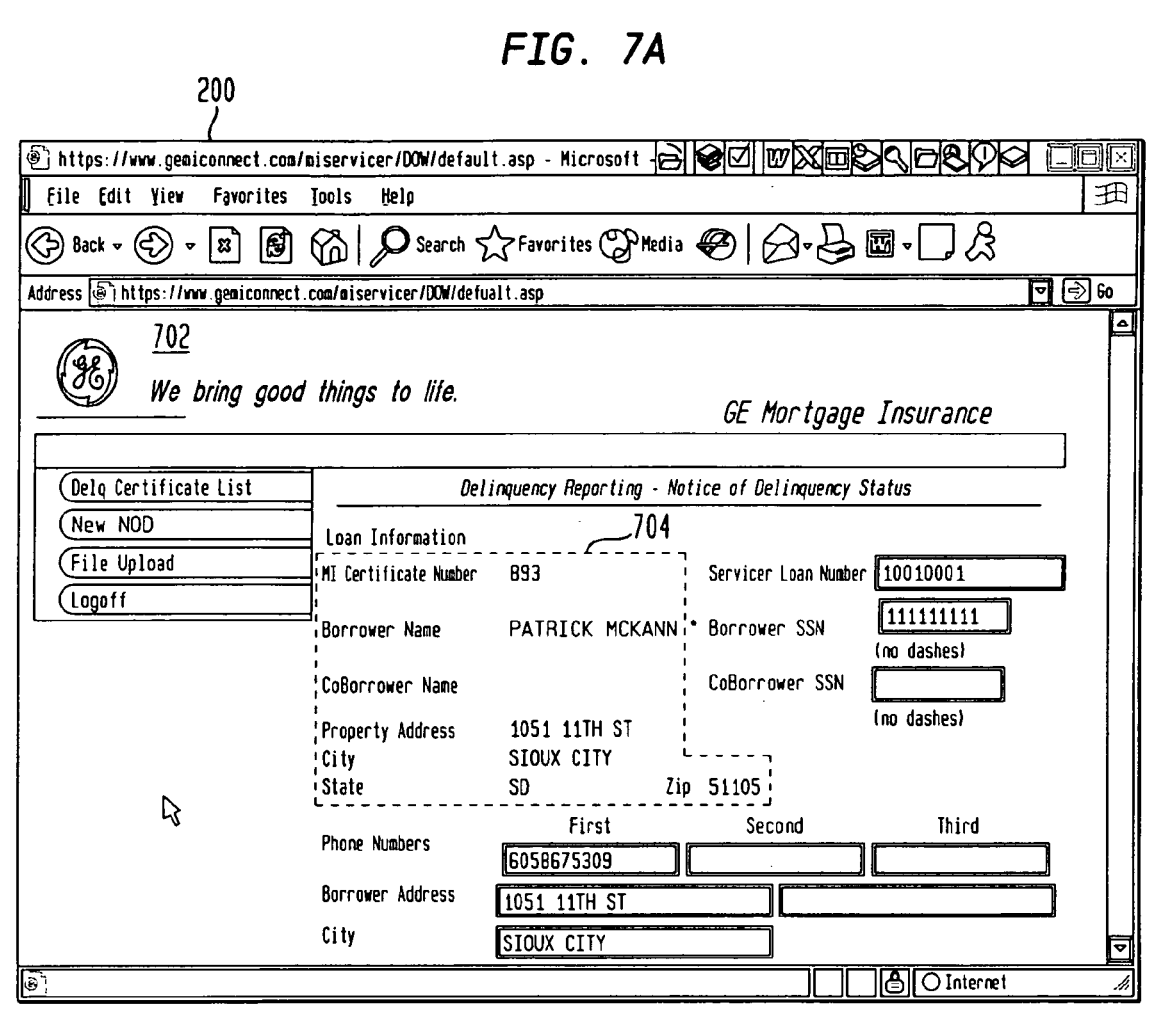

FIG. 7A illustrates the hypertext browser 200 presenting a hypertext page 702. The hypertext page 702 displays a notice of delinquency which has been saved, for example using the page 602, and subsequently retrieved, for example using the page 502. The page 702 is similar to the page 602. However, it will be noted that the field 704 includes the mortgage insurance certificate number, borrower name and property address as permanent entries, rather than as fields in which data may be entered. The reason for this permanence is that this information does not change for a particular notice of delinquency. The page 702 provides fields similar to the fields of the page 602 in order to allow modification of information which may be changed, but there is no need to allow changing of the certificate number, borrower name and property address once a notice has been entered.

Figure 7B:
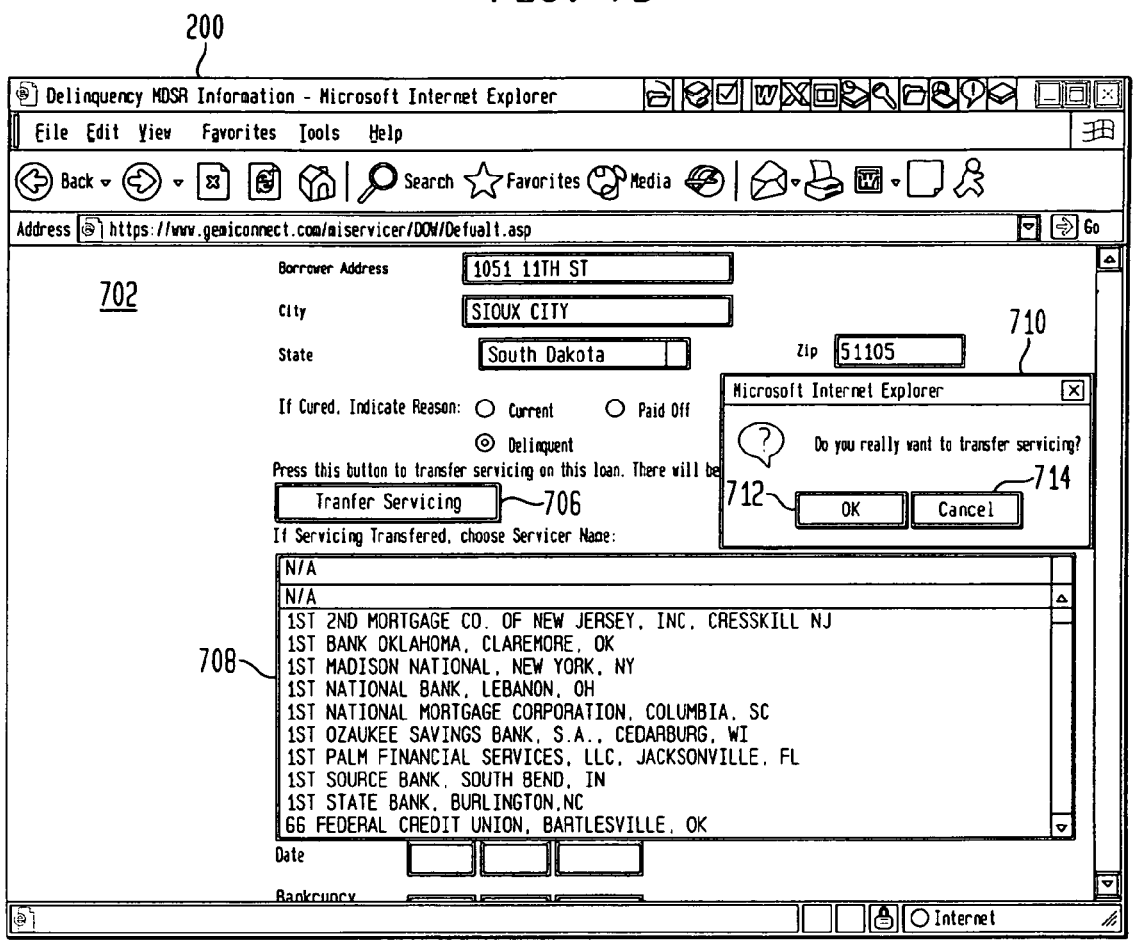

FIG. 7B shows the page 702, with additional features visible which do not have corresponding features in the page 602. The page 702 can be seen here to include a "Transfer Servicing" button 706 and a drop down list of eligible servicers 708. When the page 702 is initially presented, the list 708 is not visible, but appears after a user activates the "Transfer Servicing" button 706. If the user wishes to transfer servicing of the mortgage, he or she selects a servicer from the list 708. A dialog box 710 then appears, allowing the user to proceed with the action by activating the OK button 712 or cancel the action by activating the "Cancel" button 714. If the user activates the "Cancel" button 714, the box 710 disappears. If the user activates the "OK" button 712, the database 118 is updated to reflect the change of servicers when the user presses a "Save and Ready to Submit" button or a "Save and Next" button. These buttons are not shown here, but are similar in function to the buttons 670 and 672, respectively, of FIG. 6E.

Figure 8:
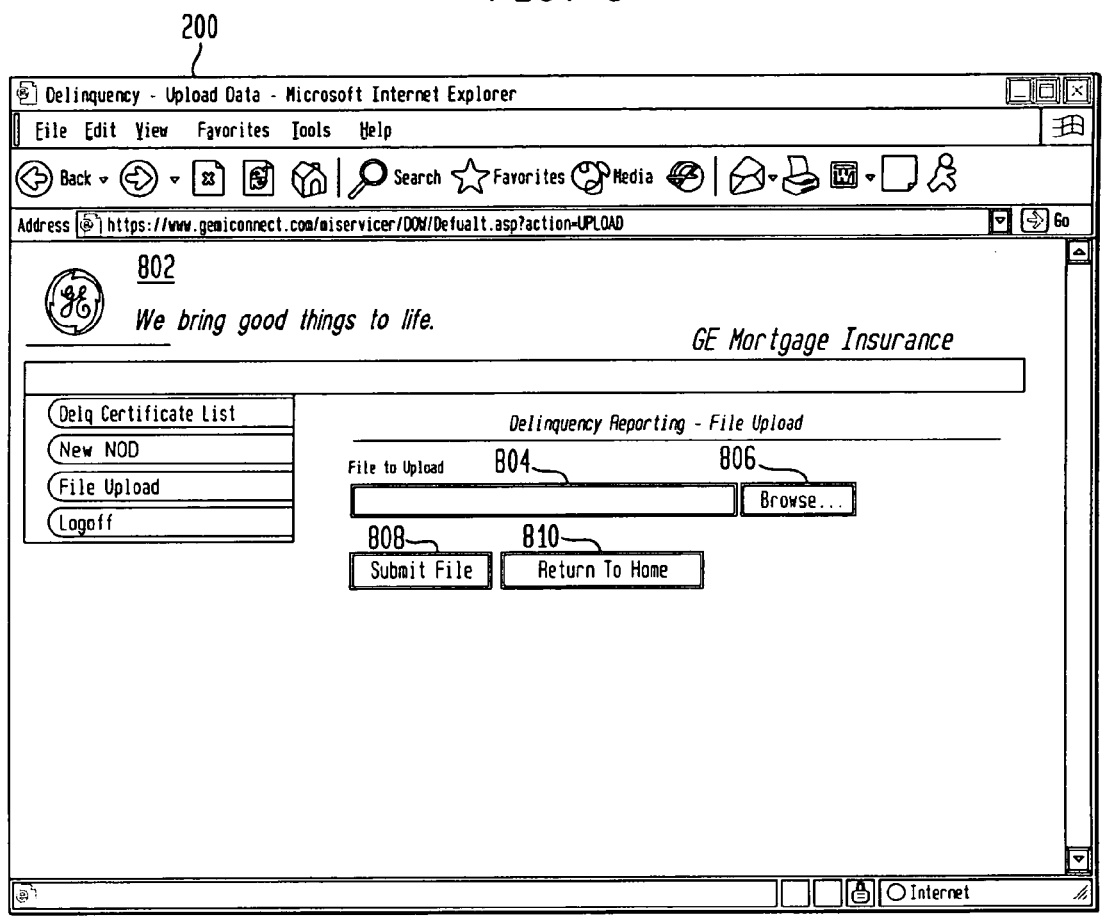
FIG. 8 illustrates a page allowing identification of a file for upload and uploading of that file.

FIG. 8 illustrates the hypertext browser 200, displaying a hypertext page 802 presented after the "File Upload" button 508 of FIG. 5A, for example, has been activated. The page 802 includes a field 804 for entering a path to a file which it is desired to upload, a "Browse" button 806, activation of which initiates a process of navigating to a desired file, a "Submit File" button 808 and a "Return to Home" button 810. Activation of the "Return to Home" button 810 abandons the process of uploading a file, while activation of the "Submit File" button 808 causes the delinquency information manager 116 to transfer the file to the database 118.

Figure 9:
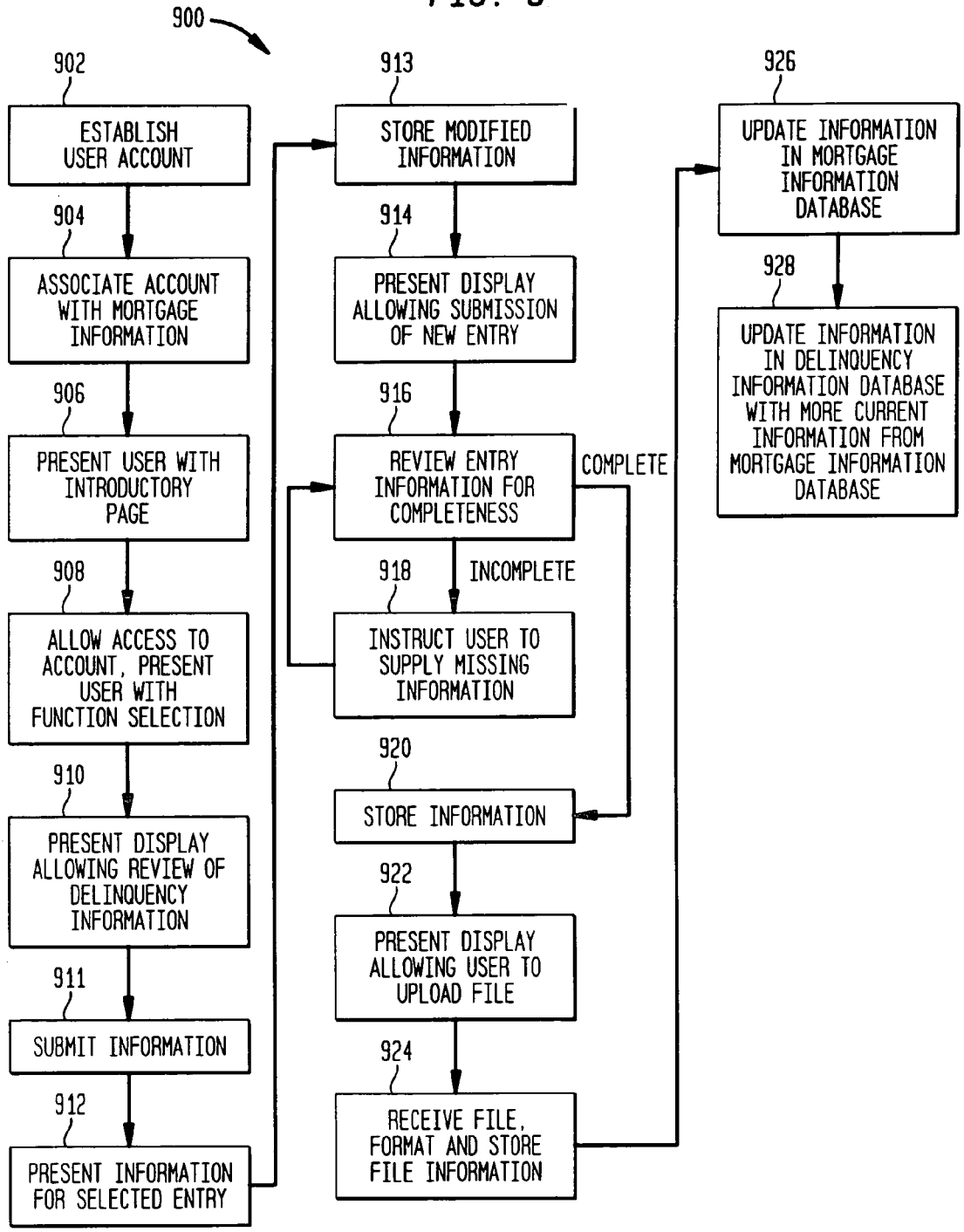
FIG. 9 illustrates a process of delinquency information management and reporting according to an aspect of the present invention.

FIG. 9 illustrates the steps of a method 900 of managing delinquency information according to an aspect of the present invention. At step 902, a user account, identified by a username and password, is established for a mortgage servicer having a relationship with a mortgage insurer, in order to allow a user associated with or employed by a mortgage servicer to transmit delinquency information to the mortgage insurer and to view and modify delinquency information previously submitted. At step 904, the account is associated with mortgage insurance certificate information, such as certificate numbers and other relevant mortgage information, such as loan identification numbers, borrower identification and the like relating to mortgages serviced by the particular servicer for whom the username and password have been established.

At step 906, upon submission by a user of an address allowing access to delinquency information managed by the mortgage insurer, preferably through a user computer connected to a publicly accessible network such as the Internet, an introductory display including an authentication form is presented to the user, allowing entry of a username and password. At step 908, upon submission by the user of a username and password and authentication of the username and password, access to the account identified by the username and password is authorized, as well as access to an electronic data storage area in which information associated with the account may be stored. Access is also allowed to any information associated with the account which has been previously stored in the electronic data storage area. The user is also presented with a subsequent form allowing selection of one or more functions, at least one of which is delinquency reporting, that is, access to and submission of delinquency information associated with the account. At step 910, upon a selection by the user of the delinquency reporting function, a display is presented allowing review of delinquency information associated with the username. The display may suitably be similar to the page 502 and may include a list of entries, any of which may be selected for display, or a field in which an entry identifier may be entered in order to retrieve the entry associated with the identifier. The entries may suitably be stored in a delinquency information database. The display preferably also includes commands allowing the user to exit, to enter a notice of delinquency or to upload a file including information comprising one or more notices of delinquency. In addition, the display includes a command to submit the information, that is, to transfer the information associated with the servicer's account in the delinquency information database to a mortgage information database for use by the mortgage insurer with whom the account was established. At step 911, upon activation of the command to submit the information, the information is submitted.

At step 912, upon a user selection of an entry for display, either by selecting an entry in a list or by entering an entry identifier, a display is presented displaying entry information. The display may suitably be similar to the page 702 of FIGS. 7A and 7B. The display includes fields and commands to allow modification of the entry information. At step 913, upon entry by the user of desired information and a selection to save the information, the updated information is stored in the delinquency information database. At step 914, upon a user selection to enter a new notice of delinquency, a display is presented allowing the user to submit information for a new entry. The display may suitably be similar to the page 602 of FIGS. 6A-6E. At step 916, upon entry of desired information and a selection to save the information, the information is reviewed for completeness. If essential information is missing, for example, the property address, the amount of the delinquency or the date of the delinquency, the process proceeds to step 918 and the user is presented with a notice instructing him or her to supply the missing information. Upon a selection to save the information, the process then returns to step 916. If the information is complete, the process proceeds to step 920 and the information is stored in the delinquency information database.

At step 922, upon selection by a user to upload a file, the user is presented with a display, preferably similar to the page 802 of FIG. 8, allowing him or her to enter the file path and name of a file containing information comprising one or more notices of delinquency The display may suitably allow the user the choice of entering the file path and name directly, or by browsing a disk or network. Upon entry by the user of the file path and name and a selection to submit the information, the process proceeds to step 924, the file is uploaded from the location entered by the user and the information contained in the file is placed in proper format and stored in the delinquency information database.

At step 926, the information in the mortgage information database is updated in response to commands and data received from users associated with the mortgage insurer. Periodically, at step 928, the information in the delinquency information database is compared to the information in the mortgage information database. If information in the mortgage information database is more current than equivalent information in the delinquency information database, the information in the delinquency information database is updated with the more current information from the mortgage information database.

For ease of illustration, the steps 902-928 are presented here as occurring in sequence. It will be recognized, however, that the steps may be performed in whatever order is desired in order to achieve the desired management and transmission of delinquency information.

While the present invention is disclosed in the context of aspects of a presently preferred embodiment, it will be recognized that a wide variety of implementations may be employed by persons of ordinary skill in the art consistent with the above discussion and the claims which follow below.

The invention claimed is:

1. A system for managing and reporting mortgage delinquency information, comprising:
    a delinquency information database for receiving, storing and maintaining mortgage delinquency information entries, each mortgage delinquency information entry comprising information identifying and providing relevant details about a delinquent mortgage including information identifying a property for which a mortgage is in a delinquent state and information identifying the nature and status of the delinquency; and
    a delinquency information server configured to retrieve delinquency information entries from the delinquency information database and store delinquency information entries in the delinquency information database, the delinquency information server being accessible to a user computer through a publicly accessible network, the delinquency information server presenting one of a number of selectable interfaces upon selection by the user allowing the user to transmit delinquency information from the user computer through the publicly accessible network, the selection of interfaces including a form for creation and transmission of new delinquency information entries, creation of a new delinquency information entry resulting in transmission of an initial report of delinquency of a specified mortgage from a mortgage servicer to a mortgage insurer, and a form for modification of previously submitted delinquency information entries and an interface for identification and uploading of a file containing delinquency information, the delinquency information server configured to format the delinquency information and store it in the delinquency information database in the form of delinquency information entries after the delinquency information is received from the user computer.

2. The system of claim 1 further comprising a mortgage administration server and wherein the delinquency information server is configured to transmit delinquency information from the delinquency information server to the mortgage administration server upon a command by the user to the delinquency information server to transmit the delinquency information.

3. The system of claim 1 further comprising a mortgage administration server and wherein the delinquency information server is configured to transmit delinquency information from the delinquency information server to the mortgage administration server upon a command by the user to the delinquency information server to transmit the delinquency information.

4. The system of claim 3 wherein the mortgage administration server hosts a mortgage administration manager operative to receive and process delinquency information entries from the delinquency information manager.

5. The system of claim 4 and also including a mortgage information database for storing delinquency information entries received by the mortgage administration manager.

6. The system of claim 5 wherein each delinquency information entry and each mortgage information entry identifies a servicer who is servicing a mortgage identified by the entry.

7. The system of claim 6 wherein the delinquency information server allows access to delinquency information entries only to authorized users associated with servicers identified in the entries.

8. The system of claim 7 wherein one or more of the interfaces presented to the user by the delinquency information manager are hypertext pages.

9. The system of claim 8 wherein one interface available to a user comprises a list of entry descriptions, each entry description identifying a delinquency information entry previously stored by the user and wherein each entry description includes a hypertext link which can be activated by the user and wherein the delinquency information server displays details of the entry identified by the entry description upon activation of the hypertext link.

10. The system of claim 9 wherein the form for creation and modification of delinquency information are hypertext pages including fields and commands for entry and modification of the information and commands for storing of the information.

11. The system of claim 10 wherein the publicly accessible network is the Internet.

12. The system of claim 11 wherein the delinquency information server is operative to periodically compare delinquency information entries in the delinquency information database to corresponding mortgage information entries in the mortgage information database to determine if the corresponding mortgage information entries are more current than the delinquency information entries and, if so, to update the delinquency information entries to reflect more current information in the mortgage information entries.

13. A method of mortgage delinquency management, comprising the steps of:
    establishing an account identifying a mortgage servicing entity;

establishing a connection with a user computer through a publicly accessible network;

upon presentation of authentication information associated with the account, allowing access by the user computer to an electronic data storage area and allowing retrieval from the electronic data storage area of previously stored entries identified with the account and storage in the electronic data storage area of new or updated entries identified with the account;

upon commands and selections received from a user through the user computer, presenting one or more interfaces to the user to allow creation, review, modification and storage of delinquency information entries, including information identifying a property for which a mortgage is in a delinquent status and information identifying the nature and status of the delinquency, each delinquency information entry including delinquency information identifying and providing relevant details about a mortgage associated with the servicing entity, creation of a new delinquency information entry resulting in transmission of initial notification of a delinquency to a mortgage insurer, at least one interface allowing identification and upload of a file from the user computer; and upon receiving one or more delinquency information entries from the user computer and receiving a command to store the delinquency information entries, storing the delinquency information entries in the electronic data storage area.

14. The method of claim 13 wherein the electronic data storage area is a delinquency information database hosted on a delinquency information server.

15. The method of claim 14 further comprising a step of transferring information in the delinquency information entries from the delinquency information database to a mortgage information database from which the information contained in the delinquency information entries is accessible to users associated with a mortgage insurance provider.

16. The method of claim 15 further comprising a step of updating the information in the mortgage information database in response to commands and data received from users associated with the mortgage insurance provider.

17. The method of claim 16 further comprising a step of periodically comparing the information in the mortgage information database against equivalent information in the delinquency information database and updating the information in the delinquency information database with more current information from the mortgage information database.

18. The method of claim 17 wherein the interfaces are hypertext pages.

19. The method of claim 18 wherein the step of presenting interfaces to the user includes presenting a list of entry descriptions, each entry description identifying a delinquency information entry previously stored by the user and wherein each entry description includes a hypertext link which can be activated by the user and wherein the delinquency pg,23 information manager displays details of the entry identified by the entry description upon activation of the hypertext link.

* * * * *